United States Patent [19]
Hernandez et al.

[11] Patent Number: 4,887,793
[45] Date of Patent: Dec. 19, 1989

[54] DISK COMPRISING AT LEAST ONE OPENING AND TAP COMPRISING SAID DISK

[75] Inventors: Michel Hernandez, Aulnay Sous Bois; Patrice Herve; Yves Gougouyan, both of Paris, all of France

[73] Assignee: C.I.C.E. S.A. of Les Miroirs, Paris, France

[21] Appl. No.: 204,125

[22] Filed: Jun. 8, 1988

[30] Foreign Application Priority Data

Jun. 17, 1987 [FR] France ............................ 87 08466

[51] Int. Cl.⁴ .............................. F16K 5/10; F16K 41; F16K 06
[52] U.S. Cl. ..................................... 251/208; 251/304
[58] Field of Search .................... 251/205, 208, 304; 137/625.17, 625.3, 625.31, 627.41

[56] References Cited

U.S. PATENT DOCUMENTS

| | | | |
|---|---|---|---|
| 1,751,591 | 3/1930 | McCloskey | 251/208 |
| 2,165,639 | 4/1937 | Marx | 137/601 |
| 2,968,474 | 1/1961 | Eichelman et al. | 251/208 |
| 3,812,882 | 5/1974 | Taylor | 251/208 |
| 3,987,819 | 10/1976 | Scheuermann | 251/208 |
| 4,161,307 | 7/1979 | Clinch et al. | 251/208 |
| 4,205,822 | 6/1980 | Bernat | 251/208 |
| 4,327,758 | 5/1982 | Uhlmann | 251/208 |
| 4,453,567 | 7/1984 | MacDonald | 137/614.11 |

FOREIGN PATENT DOCUMENTS

| | | | |
|---|---|---|---|
| 3320387 | 12/1984 | Fed. Rep. of Germany | |
| 910720 | 6/1946 | France | |
| 2518697 | 6/1983 | France | 251/208 UX |
| 434796 | 6/1934 | United Kingdom | 251/208 |
| 881325 | 11/1961 | United Kingdom | |
| 1549789 | 8/1979 | United Kingdom | |

*Primary Examiner*—George L. Walton
*Attorney, Agent, or Firm*—Browdy and Neimark

[57] ABSTRACT

A tap for liquids comprises a cylindrical hollow body in which are a liquid inlet and a liquid outlet. A fixed disk comprising a single opening for liquid to pass through is disposed in the tap body between the liquid inlet and outlet. A rotary disk comprising a single opening is disposed in contact with the fixed disk, between the latter and the liquid outlet. The rotary disk is rotated relative to the fixed disk by an operating rod between a closed configuration in which each disk closes off the opening in the other disk and an open configuration in which the openings in the disks are at least partially superposed. The opening in the fixed disk has an elongate shape which widens gradually from a relatively narrow first end to a relatively wide second end which is angularly offset relative to the first end by more than 180°. The second end is delimited externally by a circular arc concentric with the disk. It is delimited internally by an approximately radial straight line segment defining with the circular arc an angular sector open towards the first end of the opening.

13 Claims, 3 Drawing Sheets

DISK COMPRISING AT LEAST ONE OPENING AND TAP COMPRISING SAID DISK

BACKGROUND OF THE INVENTION

1. Field of the Invention

The present invention relates to devices known as taps designed to control the flow of a fluid, generally water, from a shut-off position up to a maximum flowrate adapted to the users' needs.

2. Description of the Prior Art

The commonest taps comprise a fixed seat in which is a circular opening for the liquid to pass through. A movable rubber valve member is moved by an operating handle of the tap, perpendicular to the surface of the seat. The flowrate is adjusted by varying the distance between the surface of the seat and the mobile valve member.

This type of tap has numerous disadvantages:
rapid wear,
imprecise position of the valve member, and therefore of the associated operating handle, when the tap is closed,
performance varying with time, etc.

For this reason a new generation of products has been developed, utilizing ceramic plates. Their operating principle is as follows:

Two disks, generally of alumina, comprise one or more sector-shaped openings and each has at least one extremely flat and highly polished side.

The sectors are substantially identical and equal in number on the two disks, occupying angular positions adapted to come into corresponding relationship at a specific relative angular position of the two disks.

These two disks are superposed with the polished sides in contact and the fluid whose flowrate is to be controlled is fed in behind one of the two disks, which is usually fixed.

A mechanical device coupled to the operating handle of the tap rotates one of the disks relative to the other.

According to whether the openings are made coincident or not, the fluid is allowed to pass through or not. The flowrate is adjusted according to the amount the openings overlap.

Taps of this type are described in document US-A-2.165.639, in particular.

Most products available on the market comprise one or two openings in each disk respectively delimited by one or two straight line segments parallel to diameters of the disk and a circular arc concentric with the perimeter of the disk.

In the case of disks with one opening, the shape of the latter is approximately that of a half-disk. The maximum flowrate is obtained for a rotation of 180°. By extension, these taps are known as "half-turn" taps.

In the case of disks with two openings, the shape used is approximately that of a quarter-disk. The maximum flowrate is obtained for a rotation of 90°. By extension, these taps are known as "quarter-turn" taps.

In both cases the shape of the openings is symmetrical and can always be bisected by a line passing through the center of the disk.

These taps have several disadvantages:
an insufficient range of adjustment, for which the theoretical maximum is 180° and the practical limit much smaller because of problems with overlapping; note that the sectors on either disk cannot occupy in total more than 180°. since there must be a configuration in which the sectors do not overlap at all;
imprecise adjustment at extreme values, especially at low flowrates;
problems with obtaining linear adjustment because of the symmetry of the openings, which means that the equation giving the flowrate of the tap head cannot take into account parameters other than the water passage cross-section;
unavoidable noise in some operating positions because the shape of the water passage or passages resulting from partial overlapping of the openings comprises during all or part of the rotation an acute angle generating disturbances in the flow of the fluid.

Two European patents, Nos. 33.428 and 55.181, filed in the name of the assignees of this application describe improvements to such devices relating to reducing the flow noise under steady conditions and during operations to vary the flowrate. These documents teach only a partial solution to the aforementioned disadvantages, however.

The present invention is directed to providing a more complete solution to the aforementioned disadvantages and in particular improved sensitivity of flowrate adjustment.

The invention is based on the observation that the performance of the product can be improved by dispensing with the symmetry of the openings themselves, and even with the identical angular size and disposition of these openings on each disk.

There is already known from document FR-A-910.720 an air flowrate control device comprising two disks each comprising a narrow fish-shaped opening of small angular size; these openings are adapted to be superposed head-to-tail so that the device constitutes a throttling device. There are also known from documents GB-A-1.549 789, US-1.751.591 and GB-A-881.325 liquid taps with a single disk facing an integral portion of of the tap body in which there is a small orifice; in each of these disks there is formed an elongate opening subtending an angle of more than 180°. These documents teach very narrow openings spaced a long way in the radial direction from the center of the disk which lend themselves only to passing a maximum flowrate that is highly restricted for a given overall size. Nor do they meet the objectives of the invention, which are in particular to provide for a high flowrate.

SUMMARY OF THE INVENTION

In one aspect, the invention consists in a tap for liquids comprising a cylindrical hollow body, a liquid inlet in said body, a liquid outlet in said body, a fixed disk comprising a single opening for liquid to pass through disposed in said body between said liquid inlet and said liquid outlet, a rotary disk comprising a single opening disposed in contact with said fixed disk and between said fixed disk and said liquid outlet, and an operating rod adapted to rotate said rotary disk relative to said fixed disk between a closed configuration in which each disk closes off the opening in the other disk and an open configuration in which the openings in the disk are at least partially superposed, in which tap said opening in a first of said disks has an elongate shape which widens gradually from a relatively narrow first end to a relatively wide second end which is angularly offset relative to said first end by more than 180° said second end being delimited externally by a circular arc concentric with the disk and internally by an approximately radial straight line segment defining with said circular arc an angular sector open towards said first end, the sum of the angular amplitudes of the openings in the two disks being less than 360° and the first disk preferably being the fixed disk.

In a second aspect, the invention consists in a disk for, a tap comprising two superposed disks controlling the flowrate of a liquid, the disk comprising a single opening for the liquid to pass through having an elongate shape as defined in the preceding paragraph. A disk of this kind can replace the fixed disks in known type taps.

This makes it possible:

to increase the angle of rotation beyond 180° in the case of a single opening;

to improve the linearity of the curve of the flowrate as a function of the opening angle by optimizing the profile of the opening between its ends;

to control how the water passage shape changes as the tap is rotated by optimizing in particular the profile of the opening at its narrow end, independently of the profile at the other end.

The invention also encompasses:

a disk comprising an opening of circumferentially elongate shape generally resembling a comma and advantageously subtending an angle of more than 180°;

a disk comprising an opening of circumferentially elongate or other shape, the only constraint being that this shape shall be inscribed within a sector with an angle at the apex which is less than the angle obtained by subtracting from 360° the angular amplitude of the fixed disk opening.

In practice the sum of the angular amplitudes of the openings in the two disks is substantially less than 360° to provide for sufficient reciprocal obturation of the disks to render the tap fluid-tight. Numerous shapes are feasible for the openings in the two disks. For optimum exploitation of the principle herein stated, the use of computer-aided design is recommended. CAD enables the shape and the cross-section of the water passage obtained by overlapping of the openings to be determined easily.

The improvements described in European patents Nos. 33.428 and 55.181 may be employed to improve the performance of the resulting tap. This makes it possible to control the shape and cross-section of the water passage upstream and downstream of the plane of contact between the two disks.

Appropriate shapes (inclined planes, rounded surfaces, etc) make it possible to avoid the creation of turbulence in the fluid which is kept as close as possible to laminar flow conditions.

According to preferred features of the invention:

the opening in the rotary disk has the shape of a symmetrical angular sector the angular amplitude of which is less than that of the opening in the fixed disk, which provides for a large angular displacement between the start of flow and maximum flowrate positions with hardly any modification other than to the fixed disk;

each disk comprises a single opening and the angular amplitude of the opening in the fixed disk is slightly less than 270° whereas the angular amplitude of the opening in the rotary disk is slightly less than 90°, which can be seen as a good compromise between a large range of movement and a large flow cross-section and therefore high flowrate;

the opening in the disk is defined at its first end by an annular slot of constant width.

Objects, characteristics and advantages of the invention will emerge from the following description given by way of non-limiting example only and with reference to the appended drawings.

DESCRIPTION OF THE PREFERRED EMBODIMENTS

Figure 1:
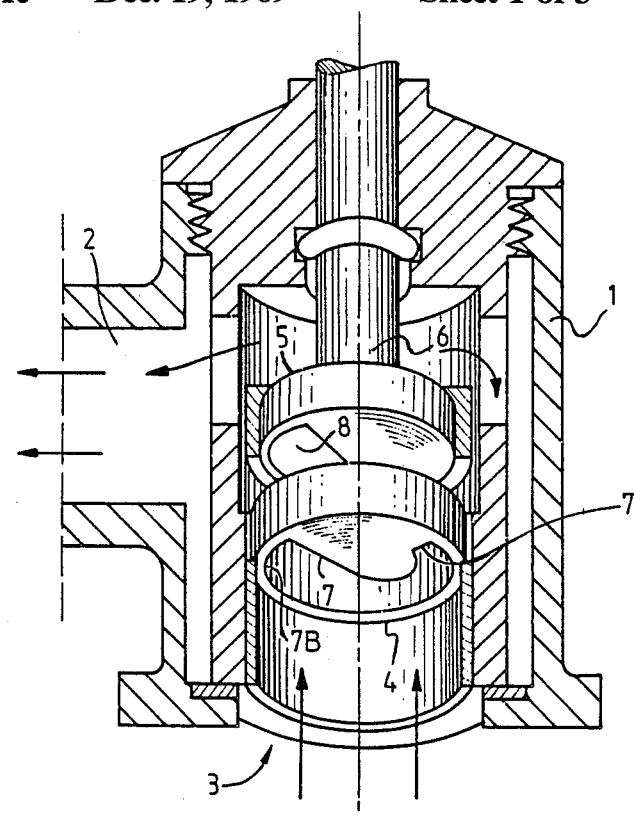
FIG. 1 is a view in axial cross-section of a tap with two superposed disks in accordance with the invention in the open configuration.

The tap shown in FIG. 1 comprises a generally cylindrical hollow body 1 on the side surface of which is an outlet 2. In its bottom is an inlet orifice 3 designed to be connected to a source of liquid under pressure, for example a domestic water main.

A flowrate control device is disposed inside the body, between the inlet 3 and the outlet 2. It comprises a fixed disk 4 and a rotary disk 5, normally in contact with the fixed disk but shown moved away from the disk 4 in FIG. 1 to facilitate understanding. The rotary disk 5 is fixed to an operating rod 6 which rotates the disk 5 as a result of forces applied to a handle disposed at the other end of the rod 6, outside the tap body 1. The disks are in contact with each other through plane and smooth surfaces which provide a seal between them. Further sealing is provided so that water can only get past the disks by passing through the openings provided for this purpose.

Figure 2:
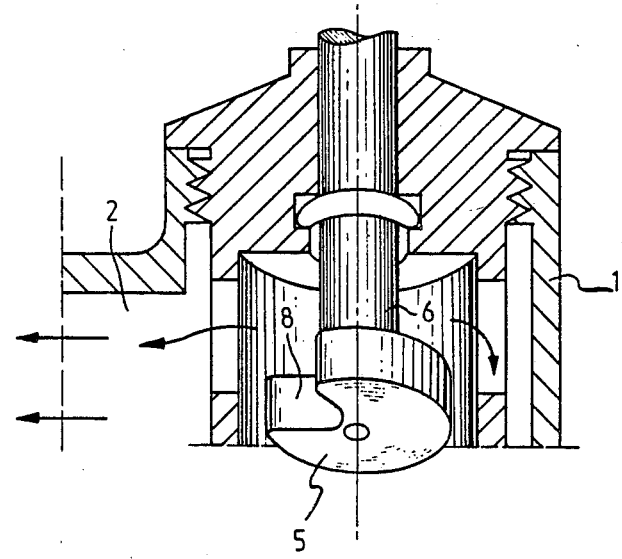
FIG. 2 is a partial view in axial cross-section of an alternative embodiment of the mobile disk of this tap.

Each of the disks 4 and 5 comprises a respective opening 7 and 8. In FIG. 2 the opening 8 is open radially.

The details of the body 1 are known from patent EP-33.428, for example, and will not be described in further detail here.

When water is fed in through the orifice 3, its flowrate depends on the flow cross-section defined by the combined openings 7 and 8. If the disks 4 and 5 are in a configuration in which each disk closes off the opening in the other, there is no flow. Otherwise the flowrate is fixed by the cross-section over which these openings overlap or are coincident.

According to the invention, the opening 7 in the fixed disk 4 has an elongate shape which widens gradually from a narrow first end 7A to a wider second end 7B angularly offset from the narrow end 7A. This circumferentially elongate shape is the shape of a comma, volute or assymetrical kidney bean.

It is important to note that there is no axial plane bisecting the opening 7.

The opening 8 in the mobile disk 5 is sector-shaped and has a bisecting plane. Its amplitude is substantially less than the angle obtained on subtracting from 360° the angular amplitude of the opening 7 measured relative to the axis of the disk 4. In an alternative embodiment (not shown) the opening in the rotary disk is also circumferentially elongate.

The angular amplitude of the opening 7 is preferably slightly less than 270° and the angular amplitude of the opening 8 is preferably slightly less than 90°.

It will be understood that this choice, which authorizes flow of fluid through only about one quarter of the internal cross-section of the body 1, goes against the normal practices of the man skilled in the art which seeks to provide a flow cross-section as large as possible, meaning close to one half the internal cross-section of the tap body. However, this disadvantage makes it possible to have a large range of angular movement of the rotary disk between the insignificant flowrate and maximum flowrate configurations, namely 270° approximately, conferring great sensitivity of flowrate adjustment.

Since in the insignificant flowrate configuration the opening 8 in the mobile disk is lined up with the narrow end 7A of the opening 7, the coincident cross-section of the two openings is small not only in the circumferential direction but also in the radial direction and widens slowly, so that the first flow lines which pass through the combination of the two disks are concentrated, unlike known solutions, and this has been found favorable to reducing unwanted noise and procuring a very precise flowrate on opening the tap. Also, the fact that the opening is narrow where the flow of water begins makes it possible to increase the flow cross-section slowly as the rotary disk rotates, which procures a high angular flowrate sensitivity. The variation in the flowrate with the relative angular position of the two disks can be made linear by optimizing the profile of the opening 4.

Figure 3:
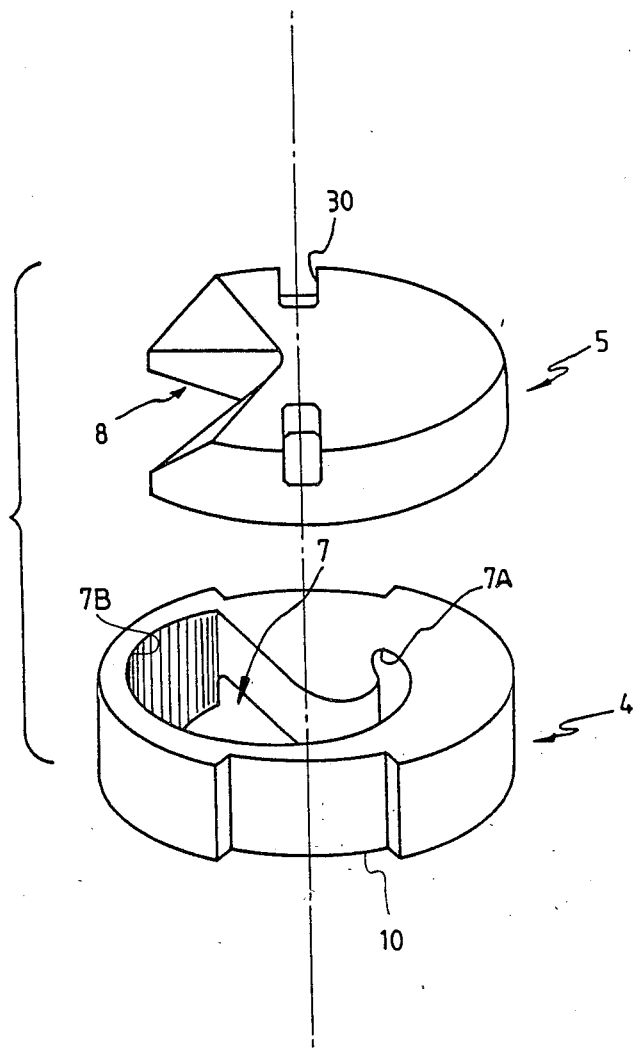
FIG. 3 is an exploded perspective view of the subsystem formed by the two disks of a tap in another embodiment, in the maximum flowrate configuration.
Figure 4:
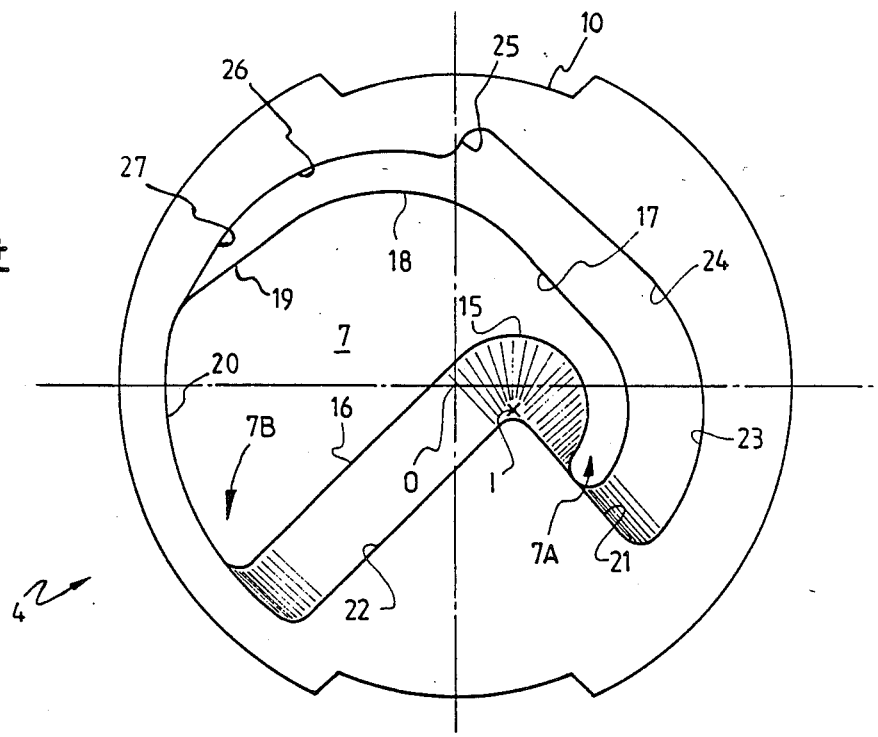
FIG. 4 is an axial bottom view of the fixed disk from FIG. 3.
Figure 5:
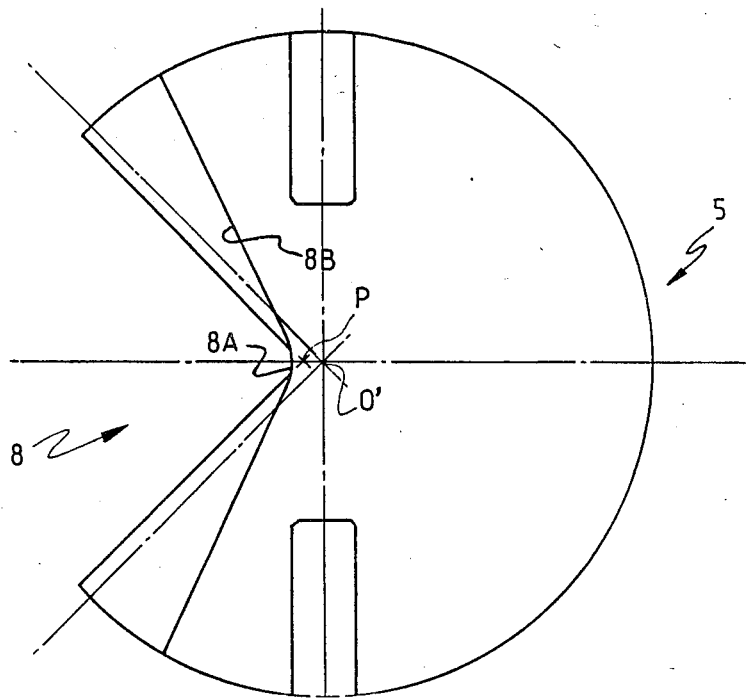
FIG. 5 is an axial top view of the rotary disk from FIG. 3.

FIGS. 3 through 5 show the geometry of the two disks 4 and 5 in detail, in one preferred embodiment.

The fixed disk 4 comprises at its periphery two notches 10 which prevent the disk rotating in the body 1. This disk has a diameter slightly larger than that of the disk 5.

Unlike that in FIG. 1, the opening in the disk 4 is divergent in the direction towards the inlet orifice 3 over part of the thickness of the disk, which reduces the water flow cross-section before the water reaches the plane of contact between the two disks. This reduces turbulence.

At its narrow end 7A, which is rounded off, the opening 7 is defined by an angular slot of constant width over approximately 90°. The radially innermost edge is continued by another circular arc 15 of the same radius over approximately 90° (approximately one half-circle in all) and then merges with a straight line segment 16 which extends up to the end 7B. The radially outermost edge of the narrow end 7A is continued by a straight line segment 17 perpendicular to the straight line segment 16 and then by a circular arc 18 to a second straight line segment 19 which merges with a circular arc 20 defining with the straight line segment 16 the end 7B. The circular arc 20 is centered on the center O of the disk whereas the edges of the end 7A and of the arc 15 are centered on a radially offset point I.

Except at the rounded tip of the end 7A and along the arc 20, the opening 7 is widened either by inclined surfaces or by rounded surfaces to an inlet shape bordered by two mutually perpendicular straight line segments 21 and 22 intersecting at a point aligned with the point I. The straight line segment 21, tangential to the rounded tip of the end 7A, is extended over 90° by a circular arc 23 centered on the point I and then by a straight line segment 24, a notch 25, a circular arc 26 and finally a transition segment 27 merging with the arc 20.

This widening occurs over a distance between half and two-thirds the thickness of the disk, from the surface on which the incoming water impinges.

The opening 8 in the disk 5 discharges radially and is in the shape of a 90° sector measured from a point P offset from the center O' of this disk towards the sector, so that the amplitude of the sector relative to the point O' is less than 90°.

This opening is bevelled except at the root 8A. This bevelling produces an outlet cross-section 8B with an angular amplitude greater than 90°. The bevelling affects an increasingly large fraction of the thickness of the disk as the distance away from the center of the disk increases.

The disk 5 further comprises diametrally opposed cavities 30 for fixing it to the rod.

It will be understood that the foregoing description has been given by way of non-limiting example only and that numerous variations may be proposed by those skilled in the art without departing from the scope of the invention. For example, the two disks 4 and 5 can be inverted if the opening in the disk 5 is closed in the lateral direction: thus the disk from FIG. 4 can be used as the fixed or mobile disk.

There is claimed:

1. Disk for a tap, the tap comprising two superposed disks controlling the flow rate of a liquid one of said disks being of substantially circular shape and comprising a single opening for the liquid to pass through having an elongate shape which widens gradually from a relatively narrow first end to a relatively wide second end which is angularly offset relative to said first end by more than 180° and less than 270°, said second end being delimited radially externally by a circular arc concentric with said one of said disk and internally by an approximately radial straight line segment defining, with said circular arc, an angular sector defining an open area facing an interior portion of said opening.

2. Disk according to claim 1, wherein said opening subtends an angle slightly less than 270°.

3. Disk according to claim 1, wherein said first end of said opening is defined by an annular slot of constant width.

4. Disk according to claim 3, wherein said annular slot subtends an angle of approximately 90°.

5. Disk according to claim 4, wherein the inside edge of said annular slot merges internally with said approximately radial straight line segment through a circular arc of the same radius as said inside edge and subtending an angle of approximately 90° and the outside edge of said annular slot merges externally with said circular arc through a straight line segment perpendicular to said approximately radial straight line segment, followed by another circular arc, followed by a second straight line segment.

6. Disk according to claim 5, wherein said opening widens to a shape bordered internally by two mutually perpendicular straight line segments merging in alignment with the center of said annular slot and one of which, tangential to the rounded tip of said first end, is extended over an angle of 90° by a circular arc centered on the center of said annular slot, followed by a straight line segment, followed by a notch, followed by a circular arc followed by a transitional straight line segment terminating at said circular arc at said second end of said opening which in turn merges with the second of said mutually perpendicular straight line segments.

7. Tap for liquids comprising a cylindrical hollow body, a liquid inlet in said body, a liquid outlet in said body, a fixed disk of substantially circular shape comprising a single opening for liquid to pass through disposed in said body between said liquid inlet and said liquid outlet, a rotary disk comprising a single opening disposed in contact with said fixed disk and between said fixed disk and said liquid outlet, and an operating rod adapted to rotate said rotary disk relative to said fixed disk on more than 180° between a closed configuration in which each disk closes off said disk and an open configuration in which said openings in said disks are at least partially superposed, in which tap said opening in said fixed disk has an elongate shape which widens gradually from a relatively narrow first end to a relatively wide second end which is angularly offset relative to said first end by more than 180° but less than 270°, said second end being radially delimited externally by a circular arc concentric with said fixed disk and internally by an approximately radial straight line segment defining, with said circular arc, an annular sector defining an open area facing an interior portion of said opening, the sum of the angular amplitudes of the openings in said two disks being less than 360°.

8. Tap according to claim 7, wherein said first disk is said fixed disk.

9. Tap according to claim 8, wherein in said opening in said rotary disk is in the shape of an annular sector which subtends an angle less than that subtended by said opening in said fixed disk.

10. Tap according to claim 8, wherein said fixed disk subtends an angle slightly less than 270° and said rotary disk subtends an angle slightly less than 90°.

11. Tap according to claim 8, wherein said first end of said opening in said fixed disk is defined by an annular slot of constant width.

12. Tap according to claim 8, wherein said opening in said fixed disk widens in the direction towards said liquid inlet and said opening in said rotary disk widens in the direction towards said liquid outlet.

13. Tap according to claim 8, wherein said opening in said rotary disk is open radially.

* * * * *